United States Patent
Kimura et al.

(10) Patent No.: US 12,400,427 B2
(45) Date of Patent: Aug. 26, 2025

(54) DISPLAY DEVICE, DISPLAY METHOD, AND DISPLAY PROGRAM FOR VISUALIZING AND MONITORING PLANT EQUIPMENT AND DEVICES

(71) Applicant: NTT Communications Corporation, Tokyo (JP)

(72) Inventors: Daichi Kimura, Saitama (JP); Kenichiro Shimada, Tokyo (JP); Tomonori Izumitani, Tokyo (JP)

(73) Assignee: NTT COMMUNICATIONS CORPORATION, Tokyo (JP)

( * ) Notice: Subject to any disclaimer, the term of this patent is extended or adjusted under 35 U.S.C. 154(b) by 462 days.

(21) Appl. No.: 17/863,504

(22) Filed: Jul. 13, 2022

(65) Prior Publication Data

US 2022/0343633 A1 Oct. 27, 2022

Related U.S. Application Data

(63) Continuation of application No. PCT/JP2020/047571, filed on Dec. 18, 2020.

(30) Foreign Application Priority Data

Jan. 14, 2020 (JP) .................. 2020-003970

(51) Int. Cl.
*G06V 10/764* (2022.01)
*G06T 7/00* (2017.01)
*G06V 30/10* (2022.01)

(52) U.S. Cl.
CPC .......... *G06V 10/764* (2022.01); *G06T 7/0004* (2013.01); *G06V 30/10* (2022.01)

(58) Field of Classification Search
CPC .... G06V 10/764; G06V 30/10; G06T 7/0004; G05B 19/418
See application file for complete search history.

(56) References Cited

U.S. PATENT DOCUMENTS

| | | | |
|---|---|---|---|
| 10,540,378 B1* | 1/2020 | Hsiao | G06F 18/24 |
| 2012/0179727 A1* | 7/2012 | Esser | G09B 29/106 |
| | | | 707/802 |
| 2020/0193708 A1* | 6/2020 | Maggiore | H04W 4/029 |

(Continued)

FOREIGN PATENT DOCUMENTS

JP 2002-342384 A 11/2002

OTHER PUBLICATIONS

"Piping and Instrumentation Diagram", Wikipedia, Available Online at: https://en.wikipedia.org/wiki/Piping_and_instrumentation_diagram, Retrieved on: Jan. 6, 2020, pp. 1-7.

*Primary Examiner* — Ming Y Hon
(74) *Attorney, Agent, or Firm* — XSENSUS LLP (57) ABSTRACT

A display device includes processing circuitry configured to acquire data of plural pieces of equipment installed in a facility, carry out image recognition of drawing data drawing the equipment disposed in the facility as a component and, based on a result of the image recognition, store, in a storage, a correspondence relation between each of the equipment installed in the facility and the component in the drawing data, and generate an image including the component corresponding to the equipment disposed on the drawing data by using the drawing data and the correspondence relation stored in the storage.

12 Claims, 6 Drawing Sheets

(56) References Cited

U.S. PATENT DOCUMENTS

| | | | |
|---|---|---|---|
| 2020/0384648 A1* | 12/2020 | Katsunuma | B25J 9/1674 |
| 2020/0401861 A1* | 12/2020 | Akechi | G06K 17/0022 |
| 2021/0003983 A1* | 1/2021 | Okamoto | G01N 21/3518 |
| 2021/0050107 A1* | 2/2021 | Sailer | G16H 30/20 |
| 2021/0365877 A1* | 11/2021 | Huie | G06V 30/41 |
| 2022/0032976 A1* | 2/2022 | Ando | G06T 11/203 |
| 2022/0070513 A1* | 3/2022 | Shirai | H04N 21/41407 |
| 2022/0172374 A1* | 6/2022 | Tsuji | H04N 7/18 |
| 2022/0318322 A1* | 10/2022 | Kamaraju | G06V 30/19147 |

\* cited by examiner

| SENSOR ID | SENSOR NAME | SENSOR DATA |
|---|---|---|
| 1 | SENSOR 1 | ... |
| 2 | SENSOR 2 | ... |
| ⋮ | ⋮ | ⋮ |

FIG.4

| COMPONENT ID | COMPONENT NAME | POSITION |
|---|---|---|
| A | SENSOR 1 | X1, Y1 |
| B | SENSOR 2 | X2, Y2 |
| ⋮ | ⋮ | ⋮ |

FIG.5

| SENSOR ID | COMPONENT ID |
|---|---|
| 1 | A |
| 2 | B |
| ⋮ | ⋮ |

DISPLAY DEVICE, DISPLAY METHOD, AND DISPLAY PROGRAM FOR VISUALIZING AND MONITORING PLANT EQUIPMENT AND DEVICES

CROSS-REFERENCE TO RELATED APPLICATIONS

This application is a continuation application of International Application No. PCT/JP2020/047571 filed on Dec. 18, 2020 which claims the benefit of priority of the prior Japanese Patent Application No. 2020-003970, filed on Jan. 14, 2020, the entire contents of which are incorporated herein by reference.

FIELD

The present invention relates to a display device, a display method, and a display program.

BACKGROUND

In various process industries of chemical, steel, energy, etc., piping and instrumentation diagrams (for example, Piping and Instrumentation Diagram: P&ID) are widely used as diagrams which illustrate flows and control information of plants and correspondence relations of pieces of main equipment such as sensors. P&ID is requested for designing of plants and is capable of visualizing the correspondence relations between devices and facilitating understanding of flows.

Based on this P&ID, operators carry out monitoring/ maintenance operation of the state in the plant in real time. P&ID forms a basement of a live imitation diagram displayed by a graphical user interface of a large-scale industrial control system such as Supervisory Control And Data Acquisition (SCADA) or a decentralized control system.

Non Patent Document 1: "Piping and instrumentation diagram", [online], [searched on Jan. 6, 2020], the Internet <en.wikipedia.org/wiki/Piping_and_instrumentation_diagram>

However, related methods have not been able to easily build a monitoring system of a target facility. More specifically, many facilities and pieces of control equipment are present in a real plant. Therefore, the related methods have not been able to easily build a monitoring system since, for example, disposing P&ID components determined by International Standardizing Association (ISA) standards by human hands to build the monitoring system costs a lot of labor.

SUMMARY

It is an object of the present invention to at least partially solve the problems in the related technology.

According to an aspect of the embodiments, a display device includes: processing circuitry configured to: acquire data of plural pieces of equipment installed in a facility; carry out image recognition of drawing data drawing the equipment disposed in the facility as a component and, based on a result of the image recognition, store, in a storage, a correspondence relation between each of the equipment installed in the facility and the component in the drawing data; and generate an image including the component corresponding to the equipment disposed on the drawing data by using the drawing data and the correspondence relation stored in the storage.

The above and other objects, features, advantages and technical and industrial significance of this invention will be better understood by reading the following detailed description of presently preferred embodiments of the invention, when considered in connection with the accompanying drawings.

DESCRIPTION OF EMBODIMENT(S)

Preferred embodiments will be explained with reference to accompanying drawings. Hereinafter, embodiments of a display device, a display method, and a display program according to the present application will be described in detail based on drawings. Note that the display device, the display method, and the display program according to the present application are not limited by these embodiments.

First Embodiment

In the following embodiment, a configuration example of a system including a display device 10 according to a first embodiment, a configuration example of the display device 10, and a flow of a process of the display device 10 will be sequentially described, and effects of the first embodiment will be described in the end.

Configuration of System

Figure 1:
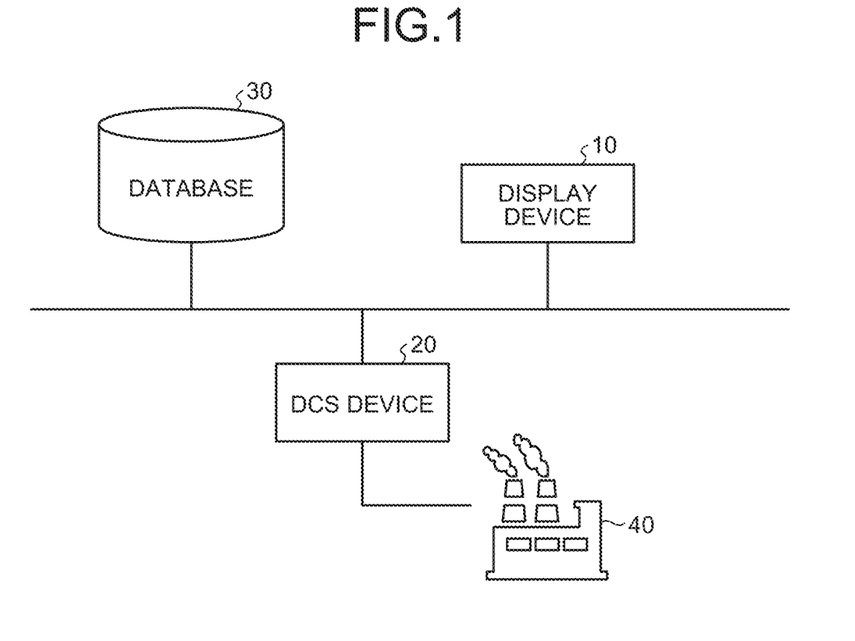
FIG. 1 is a configuration diagram of a system including a display device according to a first embodiment.

First, a configuration of the system including the display device 10 will be described by using FIG. 1. FIG. 1 is a configuration diagram of the system including the display device according to the first embodiment. The system exemplified in FIG. 1 has the display device 10, a distributed control system (DCS) device 20, a database 30, and a facility 40. Note that the configuration illustrated in FIG. 1 is merely an example, and specific configurations and the number of devices are not particularly limited.

The display device 10 is a terminal device such as a workstation which displays flow information of a process based on P&ID on a graphical user interface (GUI) application. For example, components are automatically disposed to generate image data by reading image data of P&ID and carrying out artificial intelligence (AI) or image processing. Note that a design of P&ID is image data created in a process of constructing a factory or a plant. Also, the display device 10, for example, automatically correlates components with pieces of equipment, which are stored in the database 30. Note that the components can be appropriately corrected.

The DCS device 20 collects information from pieces of equipment (for example, controllers and sensors) in the facility 40 and stores the collected information in the database 30. Also, the DCS device 20 controls the pieces of equipment in the facility 40 by carrying out communication and monitoring mutually between control devices of the equipment.

The database 30 stores information about the pieces of equipment in the facility 40. For example, the database 30 stores various sensor data in the facility 40. The facility 40 is a factory, a plant, or the like, and pieces of equipment such as sensors and controllers are installed therein.

Configuration of Display Device

Figure 2:
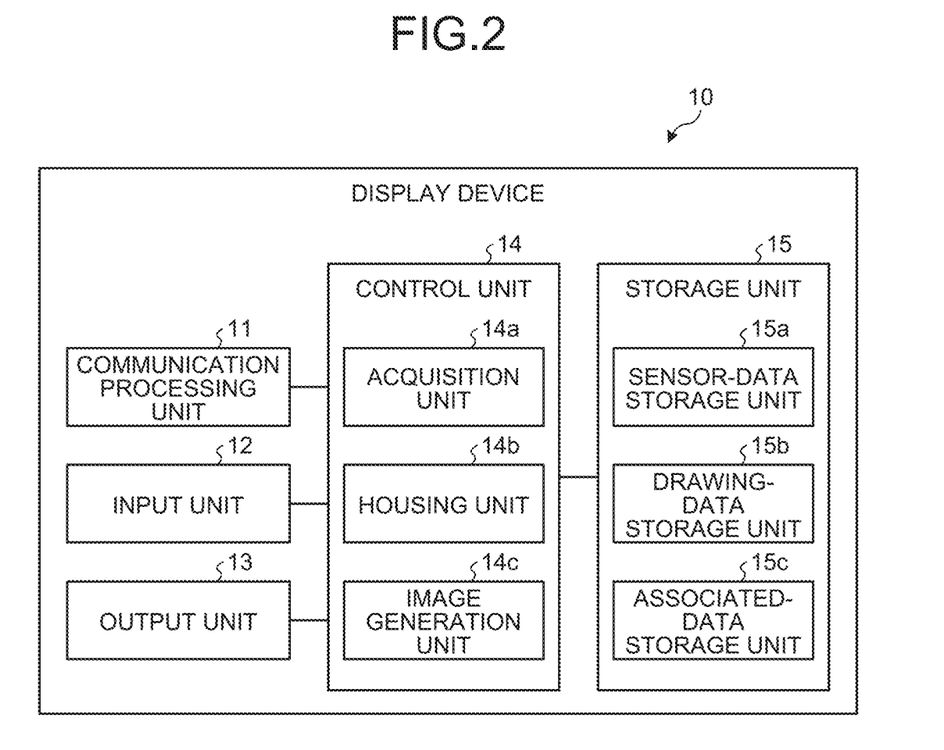
FIG. 2 is a block diagram illustrating a configuration example of the display device according to the first embodiment.

Next, a configuration of the display device 10 will be described by using FIG. 2. FIG. 2 is a block diagram illustrating a configuration example of the display device according to the first embodiment. As illustrated in FIG. 1, the display device 10 has a communication processing unit 11, an input unit 12, an output unit 13, a control unit 14, and a storage unit 15. Hereinafter, processes of each of the units of the display device 10 will be described.

The communication processing unit 11 carries out data communication with other devices via a network. For example, the communication processing unit 11 is a network interface card (NIC). The input unit 12 receives input of data from a user. The input unit 12 is an input device such as a mouse or a keyboard. The output unit 13 outputs data, for example, by display of a screen. The output unit 13 is, for example, a display device such as a display.

Also, the storage unit 15 stores data and programs used for various processing, which is carried out by the control unit 14, and has a sensor-data storage unit 15*a*, a drawing-data storage unit 15*b*, and associated-data storage unit 15*c*. For example, the storage unit 15 is a storage device such as a semiconductor memory element such as a random access memory (RAM) or a flash memory.

The sensor-data storage unit 15*a* stores the sensor data acquired from the database 30 by an acquisition unit 14*a* described later. For example, the sensor-data storage unit 15*a* stores the values of the various sensor data correlated with sensor IDs and sensor names which identify the sensors.

Figure 3:
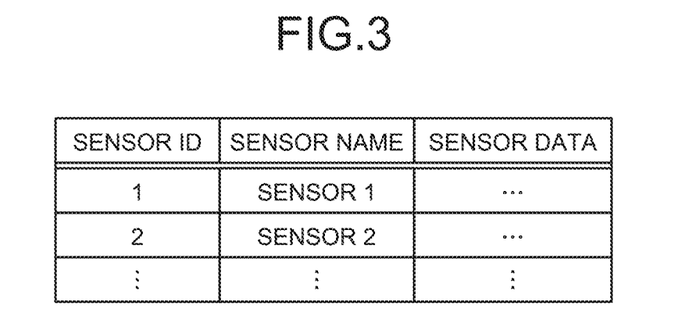
FIG. 3 is a diagram illustrating an example of data stored in a sensor-data storage unit.

Herein, by using an example of FIG. 3, an example of the data stored in the sensor-data storage unit 15*a* will be described. FIG. 3 is a diagram illustrating an example of the data stored in the sensor-data storage unit. As exemplified in FIG. 3, the sensor-data storage unit 15*a* mutually correlates and stores "sensor ID", "sensor names", and "sensor data". Note that, as the sensor data, the sensor-data storage unit 15*a* stores, for example, the values of various sensor data such as acceleration (triaxial), light intensity, temperature, humidity, magnetic force, pressure, etc. and the time at which the sensor data is acquired. Note that, as the data of sensors, the sensor-data storage unit 15*a* may store information such as the types of the sensors, the names of installed pieces of equipment, installation positions of the sensors, etc.

The drawing-data storage unit 15*b* stores drawing data in which the pieces of equipment disposed in the facility 40 are drawn as components. For example, the drawing-data storage unit 15*b* stores data of piping and instrumentation diagrams such as P&ID. Also, the drawing-data storage unit 15*b* stores the data of the components included in the drawing data.

Figure 4:
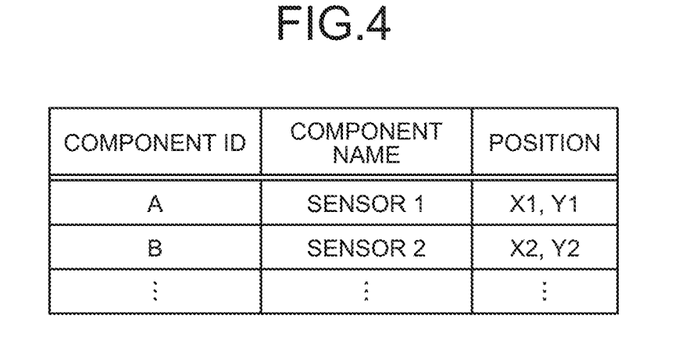
FIG. 4 is a diagram illustrating an example of data stored in a drawing-data storage unit.

Herein, by using an example of FIG. 4, an example of the data stored in the drawing-data storage unit 15*b* will be described. FIG. 4 is a diagram illustrating an example of the data stored in the drawing-data storage unit. As exemplified in FIG. 4, the drawing-data storage unit 15*b* correlates and stores "component IDs" which identify the components, "component names" which are names of the components, and "positions" indicating coordinates on the drawings of the components. Note that the drawing data stored in the drawing-data storage unit 15*b* is assumed to be stored in advance.

Figure 5:
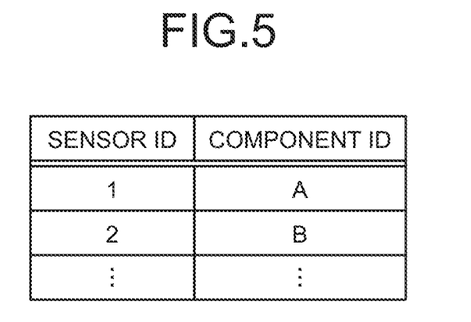
FIG. 5 is a diagram illustrating an example of data stored in an associated-data storage unit.

The associated-data storage unit 15*c* stores the data representing correspondence relations between the pieces of equipment installed in the facility 40 and the components of the drawing data. Herein, by using an example of FIG. 5, an example of the data stored in the associated-data storage unit 15*c* will be described. FIG. 5 is a diagram illustrating an example of the data stored in the associated-data storage unit. As exemplified in FIG. 5, the associated-data storage unit 15*c* correlates and stores "sensor IDs" and "component IDs". For example, in the example of FIG. 5, the associated-data storage unit 15*c* stores a sensor ID "1" and a component ID "A". This means that the sensor of the sensor ID "1" is a component of the component ID "A" in the drawing data.

The control unit 14 has an internal memory for storing a program(s) and requested data defining various processing procedure, etc. and executes various processing by the program and data. For example, the control unit 14 has an acquisition unit 14*a*, a housing unit 14*b*, and an image generation unit 14*c*. Herein, the control unit 14 is, for example, an electronic circuit such as a central processing unit (CPU), a micro processing unit (MPU), or a graphical processing unit (GPU) or an integrated circuit such as an application specific integrated circuit (ASIC) or a field programmable gate array (FPGA).

The acquisition unit 14*a* acquires the data of plural pieces of equipment installed in the facility. For example, the acquisition unit 14*a* acquires, from the database 30, plural pieces of sensor data installed in the facility 40 such as a factory or a plant and stores the data in the sensor-data storage unit 15*a*.

Herein, the sensor data acquired by the acquisition unit 14*a* is, for example, various data of temperatures, pressures, sound, vibrations, etc. about devices or reactor furnaces in a factory or a plant, which is a monitoring target facility. Note that the acquisition unit 14*a* may acquire data in real time. For example, the acquisition unit 14*a* may be configured to acquire numerical-value data of multivariate time series periodically (for example, every one minute) from the sensors installed in a monitoring target facility such as a factory or a plant.

The housing unit 14*b* carries out image recognition of the drawing data in which the pieces of equipment disposed in the facility 40 are drawn as components and, based on the results of the image recognition, stores, in the associated-data storage unit 15*c*, the correspondence relations between the pieces of equipment installed in the facility 40 and the components in the drawing data.

For example, the housing unit 14*b* carries out image recognition of the drawing data in which the pieces of equipment disposed in the facility 40 are drawn as components, gives component IDs and component names to the components included in the drawing data, and stores that in the drawing-data storage unit 15*b* together with the positions thereof in the drawing data. About a method of giving the component names, for example, the housing unit 14*b* specifies the types of the components from the shapes of symbols of the components in the drawing by image recognition and gives the names of the components corresponding to the specified types of the components.

Also, the housing unit 14b may be configured to input, as input data, the data of the pieces of equipment installed in the facility 40 and the drawing data to a learned model, which carries out the image recognition, acquire the correspondence relations between the pieces of equipment installed in the facility 40 and the components in the drawing data as output results, and store the correspondence relations in the associated-data storage unit 15c.

Moreover, the housing unit 14b may be configured to carry out the image recognition of the drawing data, in addition, subject the characters included in the drawing data to character recognition, compare the recognized characters with the names of the pieces of equipment, specify the correspondence relations between the pieces of equipment installed in the facility 40 and the components in the drawing data, and store the correspondence relations in the associated-data storage unit 15c. For example, the housing unit 14b subjects the characters included in the drawing data to character recognition and compares the recognized characters with the names of the pieces of equipment. If the recognized characters are the same or similar to the names of the pieces of equipment, the housing unit connects the pieces of equipment with the components near the characters and stores that in the associated-data storage unit 15c.

The image generation unit 14c generates an image, in which the components corresponding to the pieces of equipment are disposed on drawing data, by using the drawing data and the correspondence relations stored in the associated-data storage unit 15c. Then, the image generation unit 14c displays the generated image in response to a request of a user.

For example, the image generation unit 14c reads sensor data from the sensor-data storage unit 15a, drawing data from the drawing-data storage unit 15b, and associated data from the associated-data storage unit 15c. Then, the image generation unit 14c disposes only the components, which are stored in the associated-data storage unit 15c, on the drawing data.

Also, for example, if there are pieces of equipment which are not drawn as components in the drawing data, but are stored in the sensor-data storage unit 15a, the image generation unit 14c generates symbols of the components corresponding to the types of the sensors stored in the sensor-data storage unit 15a, estimates the disposed positions of the components based on, for example, the names of the installed pieces of equipment and the installation positions of the sensors stored in the sensor-data storage unit 15a, and disposes the components in a process flow on a GUI application. Note that the components disposed in the process flow on the GUI application can be arbitrarily subjected to disposition changes by operation made by the user.

Also, for example, the image generation unit 14c may input the drawing data and the correspondence relations, which are stored in the associated-data storage unit 15c, to a learned model which generates an image, acquire the image in which the components corresponding to the pieces of equipment are disposed on the drawing data as an output result, and display the acquired image. Note that a learned method of the above described learned model may be carried out by any of existing methods.

Figure 6:
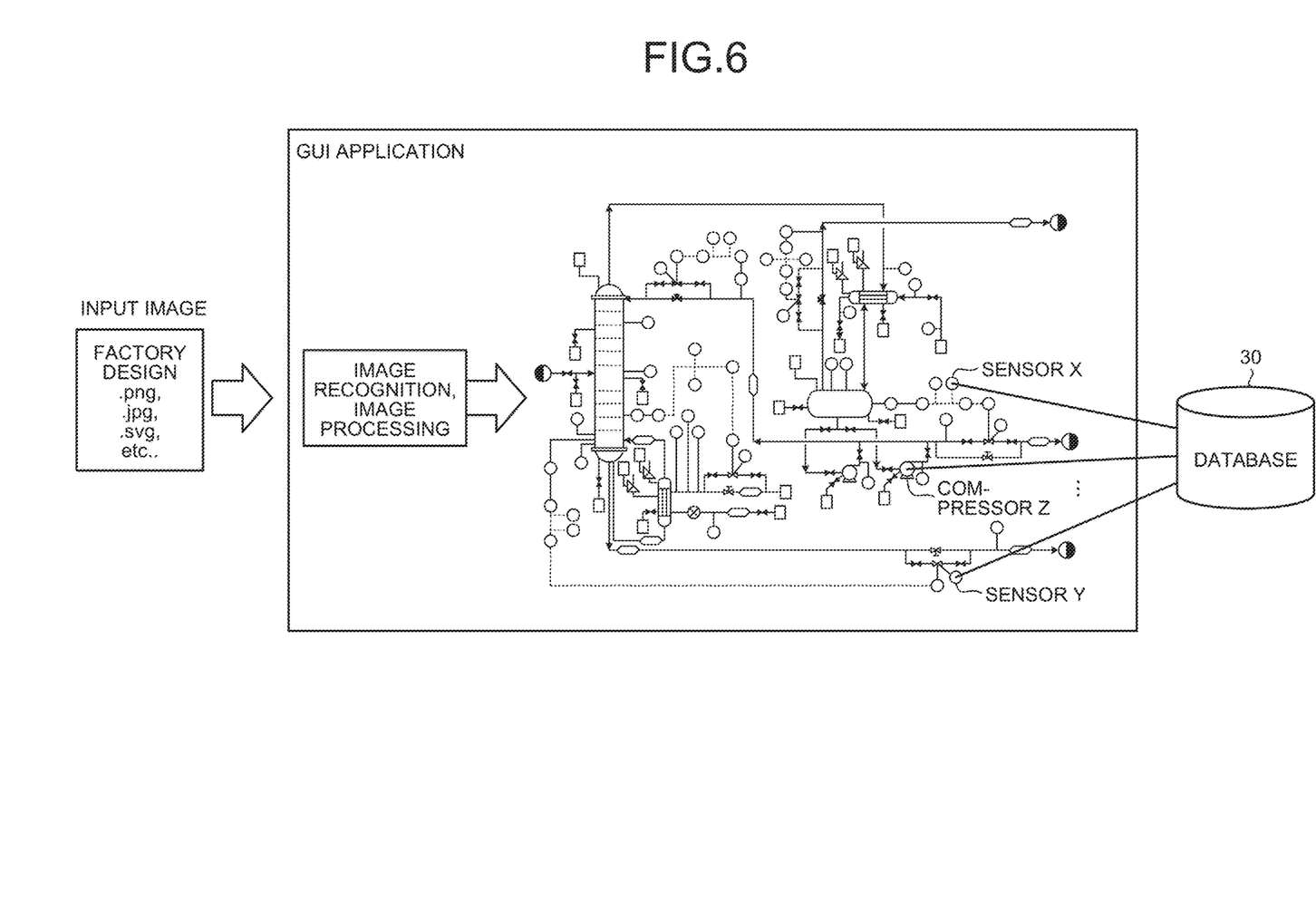
FIG. 6 is a diagram illustrating a processing example of an image generation process executed by a display device.

Herein, by using FIG. 6, a processing example of an image generation process executed by the display device 10 will be described. FIG. 6 is a diagram describing the processing example of the image generation process executed by the display device. As exemplified in FIG. 6, the display device 10 reads an image of a factory design of P&ID as an input image. Then, the display device 10 subjects the read image to image recognition and image processing and generates an image of a process flow on a GUI application.

For example, in the example of FIG. 6, the display device 10 generates components for a sensor X, a sensor Y, and a compressor Z stored in the database 30 and generates and displays an image in which the components are disposed in a process flow. Also, the display device 10 automatically connects components with the pieces of equipment of the database 30 to carry out systematization. In this manner, the display device 10 automatically generates, from a factory design, a process flow diagram, which is displayed on the GUI application, by image recognition and/or image processing using AI. Therefore, the display device 10 can easily build a monitoring system based on P&ID.

Processing Procedure of Display Device

Figure 7:
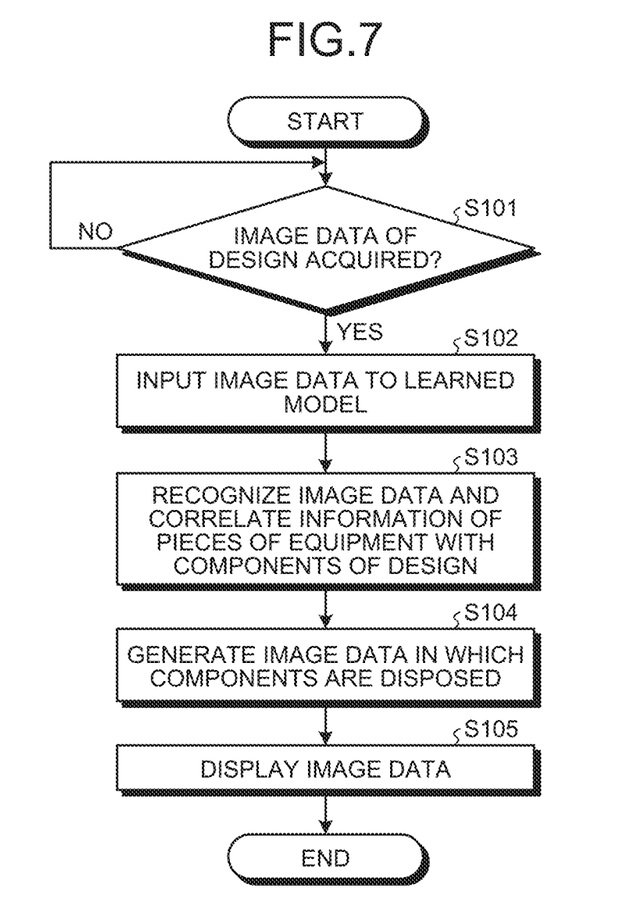
FIG. 7 is a flow chart illustrating an example of a flow of a display device according to the first embodiment.

Next, an example of a processing procedure of the display device 10 according to the first embodiment will be described by using FIG. 7. FIG. 7 is a flow chart illustrating an example of a flow of a learning process of the display device according to the first embodiment.

As exemplified in FIG. 7, when image data of a design is acquired (step S101, positive), the housing unit 14b of the display device 10 inputs the image data to a learned model (step S102). Then, the housing unit 14b recognizes the image data and correlates the information of pieces of equipment with components of the design (step S103).

For example, the housing unit 14b inputs, as input data, the data of the pieces of equipment installed in the facility 40 and the drawing data to the learned model, which carries out the image recognition, acquires the correspondence relations between the pieces of equipment installed in the facility 40 and the components in the drawing data as output results, and stores the correspondence relations in the associated-data storage unit 15c.

Subsequently, the image generation unit 14c generates image data in which the components are disposed (step S104) and displays the generated image data (step S105). For example, the image generation unit 14c inputs the drawing data and the correspondence relations, which are stored in the associated-data storage unit 15c, to the learned model which generates an image, acquires the image in which the components corresponding to the pieces of equipment are disposed on the drawing data as an output result, and displays the acquired image.

Effects of First Embodiment

The display device 10 according to the first embodiment acquires the data of plural pieces of equipment installed in the facility 40, carries out image recognition of the drawing data in which the pieces of equipment disposed in the facility 40 are drawn as components, and, based on the results of the image recognition, stores, in the associated-data storage unit 15c, the correspondence relations between the pieces of equipment installed in the facility and the components in the drawing data. Then the display device 10 generates an image, in which the components corresponding to the pieces of equipment are disposed on drawing data, by using the drawing data and the correspondence relations stored in the associated-data storage unit 15c. For example, the display device 10 automatically disposes P&ID components from a P&ID diagram created upon plant designing and connects the components with the information of real-time sensor data. Therefore, the display device 10 can easily build a monitoring system which can monitor the real-time sensor data of the pieces of equipment in the target facility.

In other words, the display device 10 can automatically connect the components with the pieces of equipment and easily build a system in which the information of the components and the real-time sensor data is connected. Also, the display device 10 automatically generates, for example from a factory design of P&ID, a process flow diagram, which is displayed on the GUI application, by image recognition and/or image processing using AI. Therefore, the display device 10 can easily build a monitoring system based on P&ID.

System Configuration, Etc.

Illustrated constituent elements of the devices are functional ideas and are not necessarily required to be physically formed as the illustration. More specifically, specific modes of dispersion/integration of the devices are not limited to the illustrated ones, and all or part thereof can be functionally or physically dispersed/integrated in arbitrary units depending on various load, usage conditions, etc. Furthermore, all or arbitrary part of the processing functions implemented by the devices are realized by a CPU or a GPU and a program analyzed and executed by the CPU or the GPU or can be realized as hardware of wired logic.

Moreover, among the processes described in the present embodiment, all or part of the processes described as automatically carried out processes may be also manually carried out, or all or part of the processes described as manually carried out processes can be also automatically carried out by a publicly known method. Furthermore, processing procedures, control procedures, specific names, and information including various data or parameters illustrated in above described document or drawings can be arbitrarily changed unless otherwise specified.

Program

Also, the processes executed by an information processing device described in the above described embodiment can be created by a program described in a computer-executable language. For example, the processes executed by the display device 10 according to the embodiment can be created by a program described in a computer-readable language. In such a case, effects similar to those of the above described embodiment can be obtained when a computer executes the program. Furthermore, processes similar to those of the above described embodiment may be realized by recording the program in a computer-readable recording medium and causing a computer to read and execute the program recorded in the recording medium.

Figure 8:
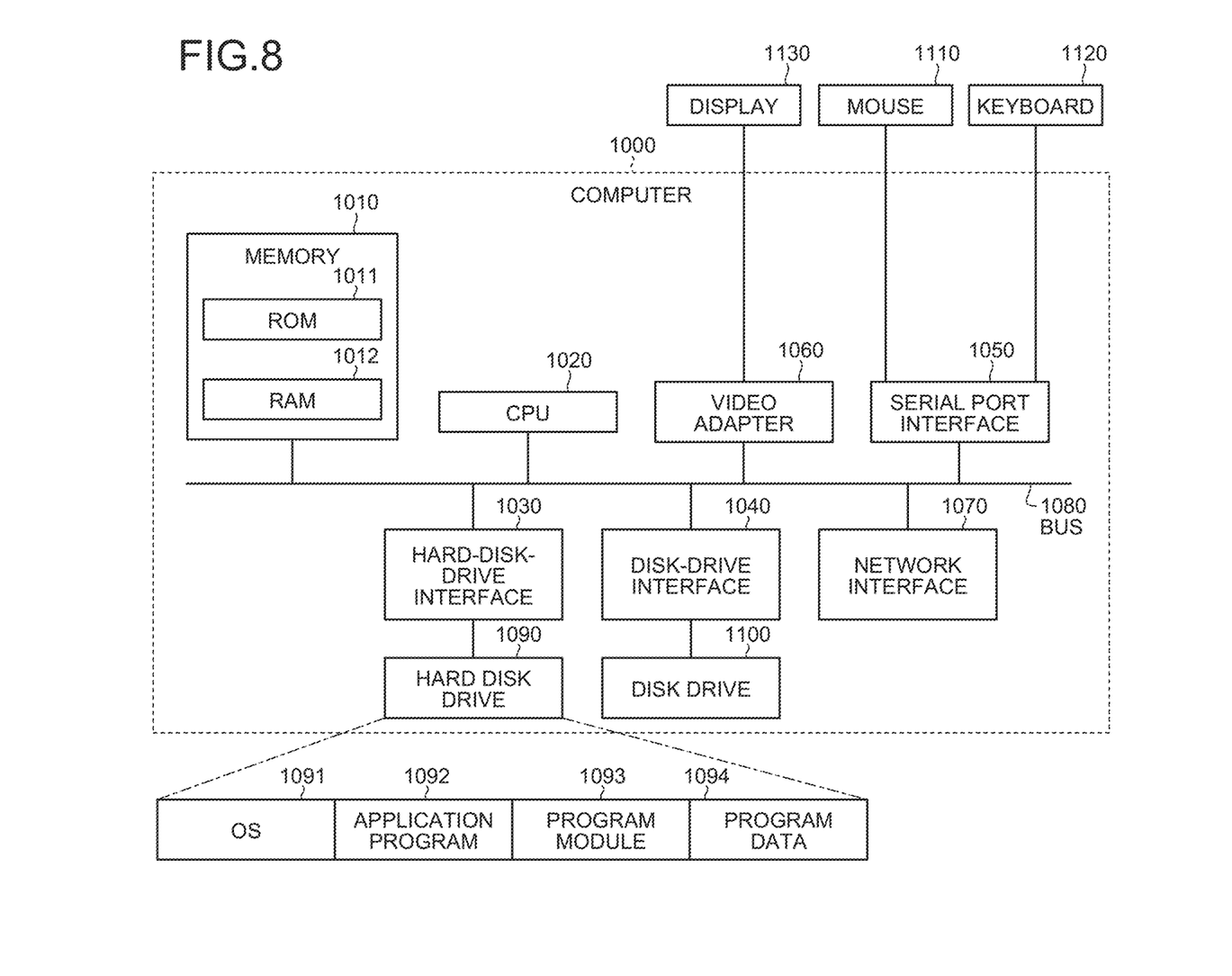
FIG. 8 is a diagram illustrating a computer which executes a display program.

FIG. 8 is a diagram illustrating a computer which executes the display program. As exemplified in FIG. 8, a computer 1000 has, for example, a memory 1010, a CPU 1020, a hard-disk-drive interface 1030, a disk-drive interface 1040, a serial port interface 1050, a video adapter 1060, and a network interface 1070, and these units are connected by a bus 1080.

As exemplified in FIG. 8, the memory 1010 includes a read only memory (ROM) 1011 and a RAM 1012. The ROM 1011 stores, for example, a boot program such as Basic Input Output System (BIOS). As exemplified in FIG. 8, the hard-disk-drive interface 1030 is connected to the hard disk drive 1090. As exemplified in FIG. 8, the disk-drive interface 1040 is connected to a disk drive 1100. For example, a detachable medium such as a magnetic disk or an optical disk is inserted into the disk drive 1100. As exemplified in FIG. 8, the serial port interface 1050 is connected to, for example, a mouse 1110 and a keyboard 1120. As exemplified in FIG. 8, the video adapter 1060 is connected to, for example, a display 1130.

Herein, as exemplified in FIG. 8, the hard disk drive 1090 stores, for example, an OS 1091, an application program 1092, a program module 1093, and program data 1094. In other words, the above described program is stored, for example, in the hard disk drive 1090 as a program module in which commands executed by the computer 1000 are described.

Also, the various data described in the above described embodiment is stored, for example, in the memory 1010 or the hard disk drive 1090 as program data. Then, the CPU 1020 loads, to the RAM 1012, the program module 1093 and/or the program data 1094 stored in the memory 1010 or the hard disk drive 1090 in accordance with needs and executes various processing procedures.

Note that the program module 1093 and/or the program data 1094 related to the program is not limited to be stored in the hard disk drive 1090, but may be, for example, stored in a detachable storage medium and loaded by the CPU 1020 via a disk drive or the like. Alternatively, the program module 1093 and/or the program data 1094 related to the program may be stored in another computer connected via a network (local area network (LAN), wide area network (WAN), or the like) and loaded by the CPU 1020 via the network interface 1070.

According to the present invention, an effect that a monitoring system of a target facility can be easily build is exerted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
processing circuitry configured to:
acquire in real-time data of plural pieces of equipment installed in a facility;
carry out image recognition of drawing data drawing the equipment disposed in the facility as a component and, based on a result of the image recognition, store, in a storage, a correspondence relation between the real-time data of each of the equipment installed in the facility and the component in the drawing data, the drawing data including a piping and instrumentation diagram (P&ID);
generate an image of process flow diagram including the component corresponding to the equipment disposed on the drawing data by using the drawing data and the correspondence relation stored in the storage; and
display the image on a display.

2. The display device according to claim 1, wherein the processing circuitry is further configured to
input, as input data, the data of the equipment installed in the facility and the drawing data to a learned model that carries out the image recognition,
acquire a correspondence relation between the equipment installed in the facility and the component in the drawing data as an output result, and
store the correspondence relation in the storage.

3. The display device according to claim 1, wherein the processing circuitry is further configured to
carry out the image recognition of the drawing data and subject a character included in the drawing data to character recognition,
compare the recognized character with a name of the equipment to specify the correspondence relation between the equipment installed in the facility and the component in the drawing data, and
store the correspondence relation in the storage.

4. The display device according to claim 1, wherein the processing circuitry is further configured to input the drawing data and the correspondence relation stored in the storage to a learned model that generates the image and acquire, as an output result, the image including the component corresponding to the equipment disposed on the drawing data.

5. The display device according to claim 1, wherein when the storage stores data of equipment that has no corresponding component in the drawing data, the circuitry is further configured to include a component on the image of the process flow diagram corresponding to the equipment that has no corresponding component in the drawing data using a learned model.

6. The display device according to claim 1, wherein the data of the plural pieces of equipment include at least one of sensor data, temperature data, pressure data, vibration data, and sound data.

7. A display method comprising:
 acquiring in real-time data of plural pieces of equipment installed in a facility;
 carrying out image recognition of drawing data drawing the equipment disposed in the facility as a component and, based on a result of the image recognition, storing, in a storage, a correspondence relation between the real-time data each of the equipment installed in the facility and the component in the drawing data, the drawing data including a piping and instrumentation diagram (P&ID);
 generating an image of a process flow diagram including the component corresponding to the equipment disposed on the drawing data by using the drawing data and the correspondence relation stored in the storage, by processing circuitry; and
 displaying the image on a display.

8. The display method according to claim 7, wherein when the storage stores data of equipment that has no corresponding component in the drawing data, the method further comprises including a component on the image of the process flow diagram corresponding to the equipment that has no corresponding component in the drawing data using a learned model.

9. The display method according to claim 7, wherein the data of the plural pieces of equipment include at least one of sensor data, temperature data, pressure data, vibration data, and sound data.

10. A non-transitory computer-readable recording medium storing therein a display program that causes a computer to execute a process comprising:
 acquiring in real-time data of plural pieces of equipment installed in a facility;
 carrying out image recognition of drawing data drawing the equipment disposed in the facility as a component and, based on a result of the image recognition, storing, in a storage, a correspondence relation between the real-time data each of the equipment installed in the facility and the component in the drawing data;
 generating an image of a process flow diagram including the component corresponding to the equipment disposed on the drawing data by using the drawing data and the correspondence relation stored in the storage, the drawing data including a piping and instrumentation diagram (P&ID); and
 displaying the image on a display.

11. The non-transitory computer-readable recording medium according to claim 10, wherein when the storage stores data of equipment that has no corresponding component in the drawing data, the process further comprises including a component on the image of the process flow diagram corresponding to the equipment that has no corresponding component in the drawing data using a learned model.

12. The non-transitory computer-readable recording medium according to claim 10, wherein the data of the plural pieces of equipment include at least one of sensor data, temperature data, pressure data, vibration data, and sound data.

\* \* \* \* \*